ND OR 3,861,781

United States Patent
Hasegawa et al.

[11] 3,861,781
[45] Jan. 21, 1975

[54] SEPARABLE OPTICAL FIBER CONNECTOR AND THE METHOD OF MANUFACTURING THE SAME

[75] Inventors: Hiroyuki Hasegawa; Keizo Baba; Takemi Kamada, all of Tokyo, Japan

[73] Assignee: Nippon Electric Company, Limited, Tokyo-to, Japan

[22] Filed: Oct. 18, 1973

[21] Appl. No.: 407,674

[30] Foreign Application Priority Data
Oct. 23, 1972  Japan.............................. 47-105955

[52] U.S. Cl. ..................................... 350/96 C, 65/4
[51] Int. Cl. ............................................. G02b 5/14
[58] Field of Search ............... 350/96 B, 96 C; 65/4

[56] References Cited
OTHER PUBLICATIONS
"Stuffing of Optical Fibers," Stallard et al., IBM Technical Disclosure Bulletin, Vol. 9, No. 11, April 1967, p. 1581.

*Primary Examiner*—James W. Lawrence
*Assistant Examiner*—C. E. Church
*Attorney, Agent, or Firm*—Sandoe, Hopgood & Calimafde

[57] ABSTRACT

A separable optical fiber connector and method for manufacturing the connector are disclosed. The end portion of a thermoplastic coated optical fiber is inserted into an axial through hole in a terminal member. The through hole includes a first portion of a relatively large diameter equal to the diameter of the thermoplastic-coated optical fiber. The axial through hole tapers down to a narrow-diameter second portion which has a diameter equal to that of the optical fiber without the thermoplastic coating. The fiber is heated to remove the thermoplastic coating from the fiber, and the end of the fiber from which the coating is thus removed is inserted into the narrow-diameter second portion of the through hole. The protruding end of the fiber is then fixed to the end surface of the terminal member and is polished.

5 Claims, 3 Drawing Figures

SEPARABLE OPTICAL FIBER CONNECTOR AND THE METHOD OF MANUFACTURING THE SAME

This invention relates generally to optical fibers, and more specifically to a separable optical fiber connector and a method of manufacturing the same.

The end surface of an optical fiber for use in light wave transmission must be polished to a mirror-like flatness in order to minimize the loss of incident light. In the electrical connection of ordinary wires, it is only necessary to establish a reliable mechanical contact between the wires. In contrast, to establish an excellent optical coupling between two optical fibers, the optical axes of the fibers must be kept perfectly aligned with each other at the joint.

An optical fiber is usually made of fragile material. It is therefore common practice in the art to coat the fiber with a thermoplastic material for protection against possible mechanical breakdown and deterioration of the optical characteristics of the fiber. This protective coating causes much difficulty when it is to be removed from the fragile fiber for providing the connection between two fibers.

It is, therefore, an object of the present invention to provide a novel, separable connector structure for optical fibers which is well suited to facilitate the removal of the thermoplastic material, thereby overcoming the foregoing difficulties.

According to the structure and method of the present invention, the end portion of a thermoplastic-coated optical fiber is inserted into the axial through hole of a terminal member which has an axial cylindrical recess of a diameter of the thermoplastic-coated optical fiber tapering down to the diameter of the optical fiber itself. The fiber is preheated to a temperature higher than the softening point of the thermoplastic coating, thereby to strip the fiber off the coating at its portion coming into contact with the narrow-diameter portion of the axial through hole. The tip of the fiber protrudes out of the other end of the terminal member which is provided with a shallow cylindrical recess. The recess is filled with a bonding and fixing agent to fix the protruding end of the fiber to the end of the terminal member.

To the accomplishment of the above and to such further objects as may hereinafter appear, the present invention relates to a separable optical fiber connector and the method of manufacturing the same, substantially as defined in the appended claims and as described in the following specification taken together with the accompanying drawing in which:

Figure 1:
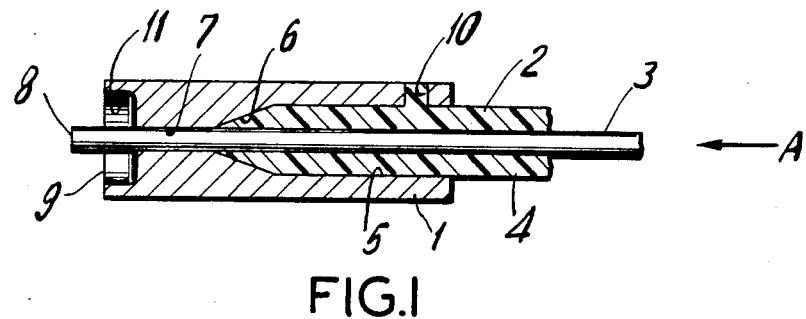
FIG. 1 is a longitudinal cross-section of a terminal member with a coated optical fiber according to an embodiment of the invention inserted in position.

Referring to FIG. 1, a terminal member 1 and an optical transmission line 2, which are separate from each other before processing, are put together as shown after the terminal member 1 is heated to a predetermined temperature to permit the insertion of the optical transmission line leftward as shown by an arrow A. That temperature should be higher than the softening point of a thermoplastic coating 4 formed about an optical fiber 3, the fiber and the thermoplastic coating together constituting the optical transmission line 2.

As the optical transmission line 2 is pushed in the direction of arrow A, the thermoplastic coating 4 readily softens as a result of the elevated temperature of the terminal member 1, so that the coating can be removed from the fiber 3 at its end portion 8 penetrating through a narrow end portion 7 of an axial through hole 5. The inner diameter of through hole 5 at the right-hand end of the terminal member, as viewed in FIG. 1, is substantially equal to the diameter of the optical transmission line 2 and is equal to the diameter of the optical fiber 3 itself, that is, without the thermoplastic coating thereon, at the small-diameter end portion 7 with a tapering portion 6 extending therebetween.

The insertion of the optical transmission line into the terminal member is continued until a predetermined suitable length of the end portion 8 of the bared optical fiber protrudes out of the end surface 9 of the terminal member. During this insertion process, the excessive amount of the softened thermoplastic coating material 4 accumulates to fill a small hole 10 provided at a suitable point of the terminal member 1 as illustrated in FIG. 1. As the assembly under this state is cooled down, the softened thermoplastic coating becomes solidified to establish a rigid mechanical coupling between the thermoplastic coating and the terminal member as shown in FIG. 1.

The protrusion of the end portion 8 of the optical fiber 3 is aimed at permitting the polishing of the end surface to bring it to an even plane with the end surface of the terminal member 1.

Figure 2:
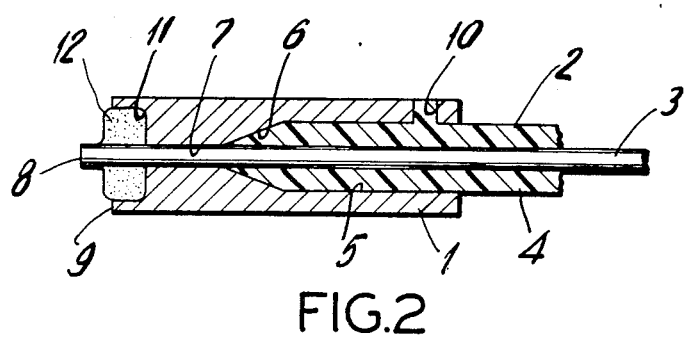
FIG. 2 is a similar view of the embodiment of FIG. 1 with a bonding and fixing agent filling the recess at the end surface of the terminal.

The recess 11 at the end surface of the terminal member 1 is then filled with a bonding and fixing agent 12 so that the end portion 8 of the optical fiber 3 and the terminal member 1 form a reliable bond as shown in FIG. 2. After the bonding and fixing agent becomes solid, the protruding end portion 8 of optical transmission line 2 is polished together with the solidified bonding and fixing agent 12 and the end surface 9 of the terminal member 1 until they become optically flat. Since the recess 11 is only provided to fix the end portion 8 of the optical fiber 3 to the terminal member 1, its geometrical shape may be chosen arbitrarily.

Thus, the fiber terminating structure adapted for optical coupling, that is, the terminal member with the optical transmission line inserted in position and with its end surface polished, can be manufactured with ease by removing a part of the thermoplastic coating without imparting any deleterious effects to the optical characteristics of the thermoplastic-coated optical fiber.

The finished terminal member 1 with the optical transmission line 2 attached thereto is ready for providing optical coupling with another identical terminal member. To achieve this, a cylindrical metal sleeve member 13 is employed, as shown in FIG. 3, whose inner diameter is substantially equal to the outer diameter of the terminal member 1 and which has an axial length sufficient to ensure the alignment of the two terminal members brought into firm contact with each other within the sleeve member 13 in a face-to-face relationship.

Figure 3:
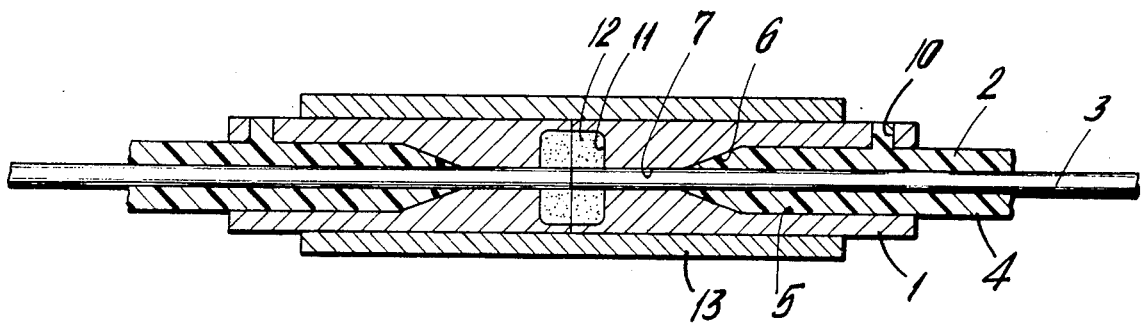
FIG. 3 is a similar view of two of the terminal members put together by means of a cylindrical sleeve to achieve optical coupling between the two coated optical fibers.

To optimize the optical coupling between the two optical transmission lines 2 in the structure of FIG. 3, the control axes of the through holes, particularly the narrow end portions 7 of the terminal members 1, must be in excellent coincidence with that of the sleeve member 13. Furthermore, it will be apparent that the present connector structure is applicable to a multiple optical connector in which more than one pair of terminal members are arranged closely to one another to permit separate parallel optical couplings. Similarly, the thermoplastic-coated optical fiber having the terminating structure of the present invention may be used without its counterpart, that is, as a separable optical transmission line, as in the case of picking up a laser beam from a laser oscillator.

Thus, although the optical fiber connector of the present invention has been herein specifically described with respect to a single embodiment thereof, it will be apparent that modifications can be made therein, all without departing from the spirit and scope of the invention.

What is claimed is:

1. A separable optical fiber connector structure adapted for optical coupling between a pair of thermoplastic-coated optical fibers or between a single such fiber and a light source, said fiber connector comprising a terminal member of symmetrical cross-section with respect to its central axis and having a through hole extending axially therethrough, said through hole having a first portion having a relatively large inner diameter that is substantially equal to the outer diameter of the thermoplastic coating of said fiber extending from one end of said terminal member, a second portion having a relatively small diameter substantially equal to the diameter of said fiber extending from the other end of said terminal member, and a tapering portion extending between said first and second portions, and an axial recess formed at said other end of said terminal member, said optical fiber being inserted from said one end of said terminal member through said through hole to protrude from said other end with its thermoplastic coating removed at said second portion and filling said first portion, and a binding and fixing agent filling said recess for providing a flat end surface at said other end of said terminal member and for fixing said fiber thereto.

2. The fiber connector of claim 1, in which said terminal member further comprises a radial opening in communication with said first portion of said through hole for receiving the thermoplastic coating, said theremoplastic coating solidifying in said opening, thereby to establish a mechanical coupling between the thermoplastic coating and said terminal member.

3. In combination with the fiber connector of claim 1, a cylindrical sleeve member surrounding at least a portion of said terminal member and having a longitudinal axis in spatial coincidence with that of said terminal member.

4. A method of manufacturing a separable optical fiber connector structure adapted for optical coupling between a pair of thermoplastic coated optical fibers or between a single such fiber and a light source, said method comprising the steps of heating the end portion of said thermoplastic-coated fiber to a temperature higher than the softening point of the thermoplastic material of the coating of said optical fiber, inserting the heated end portion of said fiber into an axial through hole of a terminal member, said through hole having a first portion of a relatively large inner diameter substantially equal to the outer diameter of said thermoplastic coating in the region adjacent to a first end of said terminal member, a second portion of a relatively small inner diameter substantially equal to that of said optical fiber in the region adjacent to a second end of said terminal member, and a tapered-inner-diameter portion extending between said first and second portions, said inserting step being carried out from said first end to said second end of said terminal member, thereby to remove the thermoplastic coating from the fiber, thereafter allowing the tip of the fiber to protrude from said second end of said terminal member, fixing the protruding end of the fiber to said second end surface of said terminal member, and polishing the end surface of the fixed end of the fiber.

5. The method as claimed in claim 4, wherein said heating step includes the step of preheating the terminal member to said temperature.

* * * * *